US 12,351,481 B2

(12) United States Patent
Mackin et al.

(10) Patent No.: US 12,351,481 B2
(45) Date of Patent: Jul. 8, 2025

(54) SYSTEMS AND PROCESSES FOR INJECTING GAS-INFUSED ADDITIVES

(71) Applicant: ECOLAB USA INC., St. Paul, MN (US)

(72) Inventors: Franklin Defraine Mackin, Shepherdsville, KY (US); Jeffrey Gordon Bacchus, Georgetown, KY (US)

(73) Assignee: Ecolab USA Inc., St. Paul, MN (US)

( * ) Notice: Subject to any disclaimer, the term of this patent is extended or adjusted under 35 U.S.C. 154(b) by 494 days.

(21) Appl. No.: 17/735,428

(22) Filed: May 3, 2022

(65) Prior Publication Data

US 2022/0356079 A1 Nov. 10, 2022

Related U.S. Application Data

(60) Provisional application No. 63/184,916, filed on May 6, 2021.

(51) Int. Cl.
*C02F 1/24* (2023.01)
*B01D 17/02* (2006.01)
(Continued)

(52) U.S. Cl.
CPC ............ *C02F 1/24* (2013.01); *B01D 17/0205* (2013.01); *B01D 21/0027* (2013.01);
(Continued)

(58) Field of Classification Search
CPC ...... C02F 1/24; C02F 1/36; C02F 1/32; C02F 1/28; B01D 21/0027; B01D 21/0205;
(Continued)

(56) References Cited

U.S. PATENT DOCUMENTS 3,883,426 A    5/1975   Lewandowski et al.
3,932,282 A    1/1976   Ettelt
               (Continued)

FOREIGN PATENT DOCUMENTS

WO         2013129159 A1    9/2013
WO    WO-2014089443 A1 *    6/2014    ............ B01D 61/04

OTHER PUBLICATIONS

International Search Report and Written Opinion for International Application No. PCT/US2022/027405, 10 pages, mailed Jul. 29, 2022.

(Continued)

*Primary Examiner* — Lessanework Seifu
(74) *Attorney, Agent, or Firm* — Eric D. Babych; Barnes & Thornburg LLP

(57) ABSTRACT

The present disclosure relates generally to systems, apparatuses, and processes for preparing a gas-infused additive that is useful within gas-floatation systems configured to separate solids and/or oils from a liquid within a suspension. The gas-infused additive can be injected into systems having a floatation consolidator to provide additional dissolved gas to the system. Advantageously, the processes and apparatuses disclosed herein are compatible with systems and processes having a single injection point for the addition of an additive or gas, without requiring substantial modification or reconfiguration of the system. The inventions described herein additionally teach that the gas-infused additive can be prepared and injected downstream of any pump present within the system, thereby protecting the pump from the damaging effects of cavitation corrosion and similar phenomena.

20 Claims, 8 Drawing Sheets

(51) Int. Cl.
 *B01D 21/00* (2006.01)
 *B03D 1/14* (2006.01)
 *B03D 1/24* (2006.01)
 *C02F 101/32* (2006.01)

(52) U.S. Cl.
 CPC .......... *B03D 1/1431* (2013.01); *B03D 1/145* (2013.01); *B03D 1/1456* (2013.01); *B03D 1/247* (2013.01); *C02F 2101/32* (2013.01); *C02F 2301/046* (2013.01)

(58) Field of Classification Search
 CPC .......... B01D 21/00; B01D 61/04; B01D 9/00; B03D 1/145; B03D 1/1456; B03D 1/1431; B03D 1/247
 See application file for complete search history.

(56) References Cited

U.S. PATENT DOCUMENTS

| | | |
|---|---|---|
| 4,114,810 A | 9/1978 | Masuda |
| 4,472,181 A | 9/1984 | Herrlander |
| 5,167,806 A | 12/1992 | Wang et al. |
| 5,372,711 A | 12/1994 | Sill |
| 5,462,669 A | 10/1995 | Yeh |
| 5,730,881 A | 3/1998 | Miknevich |
| 6,761,820 B2 | 7/2004 | Miller |
| 7,799,218 B2 | 9/2010 | Spangler |
| 8,057,556 B2 | 11/2011 | McCarty et al. |
| 8,241,405 B2 | 8/2012 | Salazar |
| 8,277,652 B2 | 10/2012 | Urquhart et al. |
| 8,431,022 B2 | 4/2013 | Ward |
| 9,890,066 B2 | 2/2018 | Guerrini |
| 10,525,380 B2 | 1/2020 | Miller et al. |
| 10,610,876 B2 | 4/2020 | Froehlich et al. |
| 10,717,089 B2 | 7/2020 | Scharrenbach et al. |
| 2015/0259231 A1 | 9/2015 | Webber et al. |
| 2019/0076869 A1 | 3/2019 | Fröhlich et al. |

OTHER PUBLICATIONS

Kia, S.F., Rai, D.N., Simmer, J.C. et al. Capture of overspray powder paint in a wet booth system. Journal of Coatings Technology 69, 23-31 (1997). https://doi.org/10.1007/BF02720167.

* cited by examiner

SYSTEMS AND PROCESSES FOR INJECTING GAS-INFUSED ADDITIVES

TECHNICAL FIELD

The present disclosure generally relates to systems and processes for separating solids or oils from liquids within a suspension. More particularly, the present disclosure relates to gas-floatation systems and processes that utilize a gas-infused additive for separating solids or oils from liquids within a suspension.

BACKGROUND

The spray painting of automobile bodies, engines and a variety of industrial and consumer articles is carried out in specialized enclosures called paint spray booths. These booths provide a controlled work area for the painting operations that enhances worker safety and minimizes the amount of contaminants that adversely impact a finished paint job. Booths can vary significantly in size and design. The booths have a work area where the actual painting is done and a backsection/underbooth area where paint overspray is removed from the air. In small or low production systems, this is accomplished by pulling the paint-laden air through a series of disposable filters. More commonly, a moving stream of air generated by booth exhaust fans pulls the paint overspray through a curtain or spray of recirculating water that effectively scrubs the paint particles from the air into a water or aqueous phase, thereby producing a suspension that is subsequently processed. The water and scrubbed paint particles are carried to a sump basin where the paint particles are separated from the water so that the water can be recycled, and the waste paint solids safely disposed.

Similar methods can also be used in pre-treatment processes used to remove oils and other contaminants from the surface of an article to be spray painted within the booth. Overspray of the agents used within the pre-treatment processes, as well as the oils and contaminants removed from the article to be painted, can be contained to the booth and captured using a curtain or spray of recirculating water, analogous to the process described above for paint overspray.

Processes for separating the paint particles or oils from the recirculating water commonly use systems having floatation consolidators that rely on gas-floatation methods to literally float the particles to the surface of the consolidator, where they can be removed by any number of compatible methods including skimming, decanting, filtration, and the like. One of the most common issues associated with these gas-floatation systems arises when an insufficient amount of dissolved air is present in the consolidator, which leads to insufficient floatation of the particles and reduced system efficiency. This issue is further complicated by the fact that many of the systems possess a single in-line injection point, which generally must be reserved for the addition of one or more chemical additives to the system, therefore limiting the options for adding additional dissolved gas to the system.

Yet another confounding factor in adding additional gas to these systems are concerns related to protecting other components of the system from the potentially harmful effects of dissolved gases. For example, adding a gas to the system upstream of pumps present within the system may result in cavitation corrosion and damage to the pump impeller that is costly and labor intensive to repair.

Innovative approaches and processes for adding additional dissolved gas to gas-floatation systems are sorely needed, ideally where the approach can be adapted to existing systems and production lines with minimal burden.

BRIEF SUMMARY

In some aspects, the present disclosure relates to a gas floatation system for separating solids or oils from a liquid within a suspension.

In some embodiments, the gas floatation system includes a consolidator configured to separate the solids or oils from the liquid, a consolidator supply pump configured to supply the suspension to the consolidator from a suspension source, a gas-infusion apparatus configured to infuse a gas into an additive to produce a gas-infused additive, an additive supply pump configured to supply the additive to the gas-infusion apparatus, and an additive injection tap configured to inject the gas-infused additive into the suspension or a liquid derived from the suspension.

In some embodiments, the consolidator supply pump is operatively connected to the suspension source via a suspension-inlet conduit and to the consolidator via a suspension-outlet conduit, and is configured to supply the suspension to the consolidator from the suspension source via the suspension-inlet and suspension-outlet conduits. In some embodiments, the additive supply pump is operatively connected to the additive source via an additive-inlet conduit and to the gas-infusion apparatus via an additive-outlet conduit, and is configured to supply the additive to the gas-infusion apparatus from the additive source via the additive-inlet and additive-outlet conduits. In some embodiments, the additive injection tap is located downstream of the consolidator supply pump and is operatively connected to the gas-infusion apparatus via an injection-tap conduit. In some embodiments, the gas-floatation system is configured to infuse the additive with the gas prior to the additive contacting the suspension or a liquid derived from the suspension.

In some embodiments, the consolidator is a floatation consolidator configured to separate the solids or oils from the liquid via a process selected from the group consisting of dissolved air floatation, induced gas floatation, and suspended air floatation.

In some embodiments, the gas-infused additive is the sole source of gas injected into the suspension.

In other aspects, the present disclosure relates to a gas-infusion apparatus for infusing an additive with a gas to produce a gas-infused additive.

In some embodiments, the gas-infusion apparatus includes a gas-infusion chamber having an additive inlet, an additive outlet, and a gas inlet; a gas diffuser disposed within the gas-infusion chamber; and a gas source configured to supply the gas to the gas diffuser, where the gas source is operatively connected to the gas diffuser via a gas-supply conduit and the gas inlet.

In some embodiments, the gas-infusion apparatus is configured to be appended to a system comprising an additive source and a floatation consolidator, wherein the additive source is configured to be operatively connected to the gas-infusion chamber via the additive inlet and the floatation consolidator is configured to be operatively connected to the gas-infusion chamber via the additive outlet. In some embodiments, the gas-infusion apparatus is configured such that the additive has a sequential flow path from the additive source, through the gas-infusion chamber, and into the floatation consolidator, wherein the additive is infused with the gas prior to contacting a suspension or a liquid derived from the suspension.

In yet other aspects, the present disclosure relates to a process for separating solids or oils from a liquid within a suspension. In some embodiments, the methods disclosed herein include dissolving a gas in an additive to produce a gas-infused additive, injecting the gas-infused additive into the suspension, mixing the gas-infused additive with the suspension, and separating the solids or oils from the liquid via a method selected from the group consisting of dissolved air floatation, induced gas floatation, and suspended air floatation. In some embodiments of the methods disclosed herein, the gas is dissolved in the additive prior to the additive contacting the suspension or a liquid derived from the suspension. In some embodiments of the methods disclosed herein, the gas-infused additive is the sole source of gas injected into the suspension.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
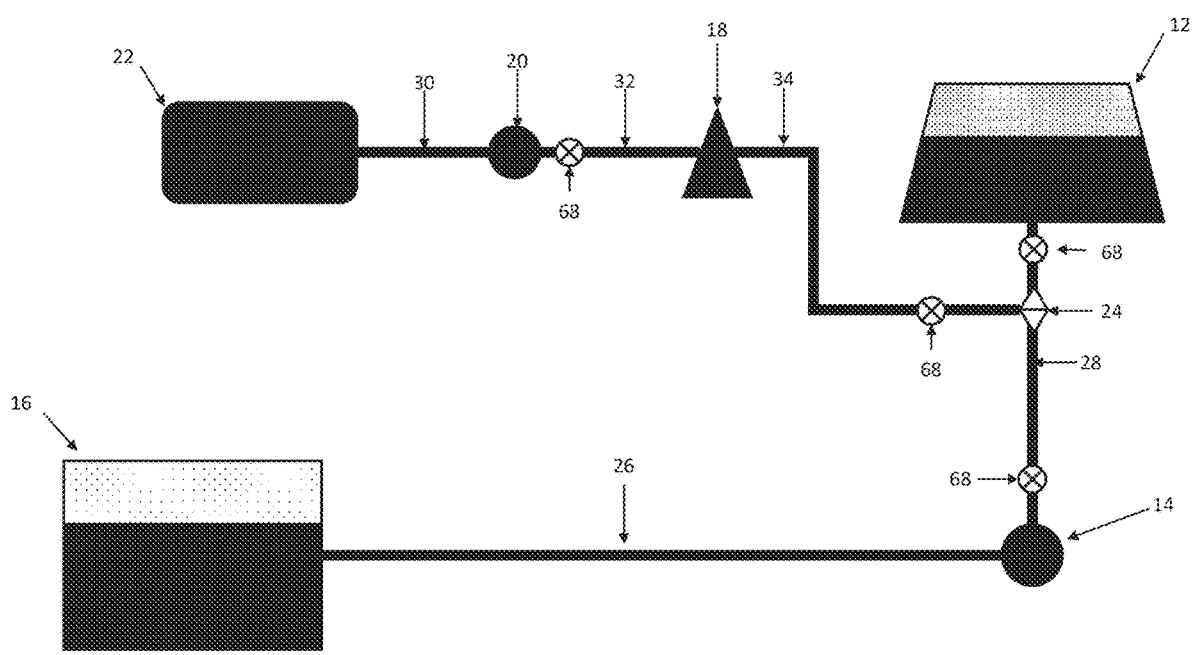
FIG. 1 shows a schematic representation of a gas-floatation system for separating solids or oils from liquids within a suspension, in which a gas-infused additive is injected into the suspension as it enters a consolidator.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as conventional fabrication and assembly.

The present disclosure relates generally to systems, devices, and processes for preparing a gas-infused additive that is useful within gas-floatation systems configured to separate solids and/or oils from a liquid within a suspension. In some instances, the gas-infused additive offers a particularly attractive approach for adding additional dissolved gas to the system, for example, in certain systems having a single injection point for adding additives or other materials to the system. Advantageously, the processes and devices disclosed herein are compatible with such single-injector systems without requiring substantial modification or reconfiguration of the system. The inventions described herein additionally teach that the gas-infused additive can be prepared and injected downstream of any pump present within the system, thereby protecting the pump from the damaging effects of cavitation corrosion and similar phenomena.

1. Gas-Floatation Systems of the Disclosure

In some aspects, the present disclosure relates to a gas-floatation system that uses gas-infused additives to separate solids or oils from a liquid within a suspension. The gas-floatation systems described herein are useful in a number of industries including, but not limited to, the automotive, food and beverage, paper manufacturing, wastewater treatment, and mining industries. The gas-floatation systems described herein are generally useful in processes for separating solids or oils from a liquid within a suspension via gas floatation. For example, the gas-floatation systems of the disclosure are useful in processes for separating paint particulates from water in suspensions produced from paint automotive paint spray booths via processes intended to capture paint overspray.

Specifically, as shown in FIGS. 1-4, the gas-floatation system 10 for separating solids or oils from a liquid within a suspension includes:

a consolidator 12 configured to separate the solids or oils from the liquid;

a consolidator supply pump 14 configured to supply the suspension to the consolidator 12 from a suspension source 16;

a gas-infusion apparatus 18 configured to infuse a gas into an additive to produce a gas-infused additive;

an additive supply pump 20 configured to supply the additive to the gas-infusion apparatus 18 from an additive source 22; and an additive injection tap 24 configured to inject the gas-infused additive into the suspension or a liquid derived from the suspension, where:

the consolidator supply pump 14 is operatively connected to the suspension source 16 via a suspension-inlet conduit 26 and to the consolidator 12 via a suspension-outlet conduit 28, and is configured to supply the suspension to the consolidator 12 from the suspension source 16 via the suspension-inlet conduit 26 and the suspension-outlet conduit 28;

the additive supply pump 20 is operatively connected to the additive source 22 via an additive-inlet conduit 30 and to the gas-infusion apparatus 18 via an additive-outlet conduit 32, and is configured to supply the additive to the gas-infusion apparatus 18 from the additive source 22 via the additive-inlet conduit 30 and the additive-outlet conduit 32;

the additive injection tap 24 is located downstream of the consolidator supply pump 14 and is operatively connected to the gas-infusion apparatus 18 via an injection-tap conduit 34; and the gas-floatation system 10 is configured to infuse the additive with the gas prior to the additive contacting the suspension or a liquid derived from the suspension.

As used herein, the term "conduit" refers to a connecting passage between the recited components that allows material to flow from one component to a second component. The conduits of the gas-floatation systems described herein are not particularly limited with respect to form or structure, and may vary depending upon the required specifications of the particular system. For example, a "conduit" can be, but is not limited to, pipes composed of any appropriate material (e.g. metals, plastics, composites, and the like), tubing composed of any appropriate material (e.g. metals, plastics, composites, and the like), or an opening within a barrier separating the components (e.g. a common wall) that allows material within one component to flow into another component.

As used herein, the term "upstream" means that the recited component of a system precedes the referenced component within the flow path of a material through the system. By way of example, if a solvent flows from a storage tank and into a pump, the storage tank is said to be upstream of the pump. Conversely, the term "downstream", as used herein, means that the recited component of a system follows the referenced component within the flow path of a material through the system. By way of the above example, the pump is said to be downstream of the storage tank.

The consolidator 12 of the gas-floatation systems described herein is configured to separate solids or oils from a liquid within a suspension, where the separation is achieved by any appropriate gas-floatation process or method known in the art. Accordingly, in some embodiments, the consolidator 12 is a floatation consolidator, which may also be known as a floatation cell. In certain embodiments, the consolidator 12 is a floatation consolidator, where the floatation consolidator is configured to separate solids or oils from a liquid within a suspension via a process selected from the group consisting of dissolved air floatation, induced gas floatation, and suspended air floatation. In certain embodiments, the consolidator 12 is a floatation consolidator configured to separate solids or oils from a liquid within a suspension via dissolved air floatation. The consolidator 12 is not particularly limited with respect to volume or shape and can be sized and shaped appropriately for the process or production line with which the gas-floatation system is to be used. Likewise, the consolidator 12 is not particularly limited with respect to the composition of the materials used to construct the consolidator, provided that the selected materials are compatible with the suspensions to be separated therein.

The consolidator supply pump 14 of the gas-floatation systems described herein is configured to supply the suspension to the consolidator 12 from the suspension source 16 and can be any style of pump that is compatible with the suspension to be treated in the system. For example, the consolidator supply pump 14 can be selected from an impeller, diaphragm, piston, peristaltic, or vane style pump, and the like, based upon the specifications required by the process or production line with which the gas-floatation system is to be used. The consolidator pump 14 is additionally configured to provide an appropriate flowrate of the suspension to the consolidator 12.

The consolidator supply pump 14 is operatively connected to the suspension source 16 via a suspension-inlet conduit 26 and to the consolidator 12 via a suspension-outlet conduit 28, and is configured to supply the suspension to the consolidator 12 from the suspension source 16 via the suspension-inlet conduit 26 and the suspension outlet conduit 28. In other words, the consolidator supply pump 14 is connected to the system between the suspension source 16 and the consolidator 12, where the consolidator 12 is downstream of the suspension source 16.

The suspension source 16 is not particularly limited with respect to form or structure, which may be varied based on the particular specifications of the production line or process in which the gas-floatation system 10 is to be used. For example, in some embodiments, the suspension source 16 can take the form of a collection tank, which may also be known as a sump basin, configured to receive and store the suspension after it is removed from a production line or process. The collection tank can be sized and shaped appropriately to meet the requirements of the production line or process in which the gas-floatation system is to be used. For example, in some embodiments, the collection tank can have a volumetric capacity of about 100 gallons to about 100,000 gallons. In other embodiments, the suspension source 16 can be a production line or process, where the suspension is directly supplied to the gas-floatation system 10 without first being stored or sequestered within a collection tank or the like.

The composition of the suspensions that are compatible with the gas-floatation systems described herein is not particularly limited, with the exception that the solids or oils should be separable from the liquid within the suspension using gas-floatation based methods. By way of example, in some embodiments, the gas-floatation systems described herein are used to separate suspensions composed of paint particulates in water that are produced in automotive paint spray booths via processes intended to capture paint overspray. In other embodiments, the gas-floatation systems described herein are used to separate particulates present in whole stillage in order to produce thin stillage. In certain embodiments, the whole stillage is the product of a dry grind corn milling operation. In certain other embodiments, the whole stillage is the product of a corn wet-milling operation.

The additive supply pump 20 is configured to supply the additive to the gas-infusion apparatus 18 from an additive source 22 and can be any style of pump that is compatible with the additive to be used in the system. For example, in some embodiments, the additive supply pump 20 is selected from an impeller, diaphragm, piston, peristaltic, gear, progressive cavity, or vane style pump, or the like, based upon the specifications required by the process or production line with which the gas-floatation system is to be used. The additive supply pump 20 is additionally configured to provide an appropriate flowrate of the additive to the gas-infusion apparatus 18. For example, in some embodiments, the additive supply pump 20 is configured to provide an additive flowrate of about 1 ppm to about 2,000 ppm to the gas-infusion apparatus 18.

The additive supply pump 20 is operatively connected to the additive source 22 via an additive-inlet conduit 30 and to the gas-infusion apparatus 18 via an additive-outlet conduit 32, and is configured to supply the additive to the gas-infusion apparatus 18 from the additive source 22 via the additive-inlet conduit 30 and the additive-outlet conduit 32. In other words, the additive supply pump 20 is connected between the additive source 22 and the gas-infusion apparatus 18, where the gas-infusion apparatus 18 is downstream of the additive source 22.

The additive source 22 is configured to receive and store the additive, and is not particularly limited with respect to form or structure. For example in some embodiments, the additive source 22 is an additive reservoir, which may also be known as an additive storage tank. The additive reservoir is not strictly limited with respect to capacity or shape, and can be sized and shaped appropriately based upon the required specifications of the particular production line or process with which the gas-floatation system is to be used. For example, in some embodiments, the system includes an additive reservoir configured to receive and store a volume of about 1 gallon to about 10,000 gallons of the additive.

The gas-floatation systems described herein are compatible with an assortment of additives with distinct chemical properties and functional uses, which may be selected and optionally admixed to meet the required specifications of the production line or process with which the gas-floatation system is to be used. The additive used within the gas-floatation system 10 can be a single chemical species or a mixture of two or more chemical species. The additive can be supplied neat in certain instances, or more preferably, in a solution where the additive is pre-diluted in a solvent (e.g. water).

In some embodiments, the additive includes a detackifying agent, a flocculation agent, a coagulation agent, or a mixture thereof.

In certain embodiments, the additive includes a polymer selected from an anionic polymer, a cationic polymer, a nonionic polymer, and mixtures thereof. In some embodiments, the additive includes an anionic polymer. In other embodiments, the additive includes a cationic polymer. In other embodiments, the additive includes a nonionic polymer.

In some embodiments, the additive includes an anionic polymer or a cationic polymer. In some embodiments, the additive includes an anionic polymer where the anionic polymer is characterized as a large-chain, high-charge polymer having an about 10% mole to an about 80% mole charge ratio and a reduced specific viscosity of about 10 dL/g to about 60 dL/g. In certain embodiments, the anionic polymer is characterized as having an anionic charge of about 30% mole to about 50% mole. In some embodiments, the anionic polymer is a structured polymer. In other embodiments, the anionic polymer is a linear polymer. In some embodiments, the additive includes a cationic polymer where the cationic polymer is characterized as a large-chain, high-charge polymer having a cationic charge of about 20% mole to an about 80% mole and a reduced specific viscosity of about 10 dL/g to about 35 dL/g. In some embodiments, the additive includes a nonionic polymer having a reduced specific viscosity of about 20 dL/g to about 50 dL/g.

In some embodiments, the additive includes an acrylamide-based polymer.

In certain embodiments, the additive includes a solution of a polymer in water having a polymer concentration of about 0.05% to about 1% by weight.

"Acrylamide monomer" means an electrically neutral monomer derived from acrylamide. Representative acrylamide monomers include acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, and the like. Preferred acrylamide monomers include acrylamide and methacrylamide. Acrylamide is more preferred.

"Cross-linking agent" means a multifunctional monomer that when added to polymerizing monomer or monomers results in "cross-linked" polymers in which a branch or branches from one polymer molecule become attached to other polymer molecules.

"Dispersion Polymers" mean a water-soluble polymer dispersed in an aqueous continuous phase containing one or more inorganic salts. Representative examples of dispersion polymerization of water-soluble anionic and nonionic monomers in an aqueous continuous phase can be found in U.S. Pat. Nos. 5,605,970, 5,837,776, 5,985,992 and 6,265,477.

"Dry polymer" means a polymer prepared by gel polymerization.

"Emulsion polymer" and mean an invertible water in-oil polymer emulsion comprising an anionic polymer according in the aqueous phase, a hydrocarbon oil for the oil phase, a water-in-oil emulsifying agent and, potentially, an inverting surfactant.

"Flocculant" means a chemical, which induces flocculation, i.e. it induces the enhanced agglomeration of material suspended within a liquid either alone or after coagulation when the liquid is stirred or otherwise mixed.

"Gel Polymerization" means a process for producing polymers as dry powders.

"Inverse emulsion polymers" mean polymers which position hydrocarbon continuous within the water soluble polymers dispersed as micron sized particles within the hydrocarbon matrix.

"Latex polymer" means an emulsion polymer that forms rubber or plastic globules in water.

In at least one embodiment, an aid is used to recover oil from the suspension by forming different phase layers. In at least one embodiment the aid comprises an anionic polymer. Anionic polymers suitable for use in the method of this invention include those prepared by polymerizing acrylic acid sodium salt, methacrylic acid sodium salt or 2-acrylamido-2-methyl-I-propanesulfonic acid sodium salt or a combination thereof and optionally one or more acrylamide monomers under free radical forming conditions using methods known in the art of polymer synthesis. Many anionic polymers are commercially available, for example from Nalco Company, Naperville, IL.

In at least one embodiment, the anionic polymer are cross-linked with about 0.005 to about 10 ppm of one or more cross linking agents. Representative cross-linking agents include but are not limited to N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal, vinyltrialkoxysilanes and the like. Preferred cross-linking agents are selected from N,N-methylenebisacrylamide, polydiethyleneglycoldimethacrylate, trimethylolpropane ethoxylate (x EO/y OH) tri(meth)acrylate, where x is 1-20 and y is 1-5, trimethylolpropane propoxylate (x EO/y OH) triacrylate, where x is 1-3 and y is 1-3, and 2-hydroxyethylmethacrylate.

In at least one embodiment, the anionic polymers are one or more of: dry polymers, emulsion polymers, inverse emulsion polymers, latex polymers, and dispersion polymers. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

In at least one embodiment, the inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

In at least one embodiment, the oil phase comprises one or more or any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

In at least one embodiment, the polymerization is facilitated by free radical yielding initiators such as benzoyl peroxide, lauroyl peroxide, 2,2'-azobis(isobutyronitrile) (AIBN), 2,2'-azobis(2,4-dimethylvaleronitrile) (AIVN), potassium persulfate and the like, which are useful in polymerizing vinyl and acrylic monomers. 2,2'-azobis (isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

In at least one embodiment, water-in-oil emulsifying agents are used for preparing the emulsion polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, polyoxyethylene sorbitan monolaurate, and the like. The sorbitan can be substituted with sucrose, glycol, glycerin, and the like. Additional details on these agents may be found in McCutcheon's Detergents and Emulsifiers, North American Edition, 1980. Any inverting surfactant or inverting surfactant mixture described in the prior art may be used. The amount the preferred emulsifying agent utilized can be varied in order to optimize polymer make down and also improve separation and recovery of the fats oil and greases present in the process stream. While the preferred method is the utilization of latex flocculants, it is also possible to feed the anionic flocculants as described alone or in combination with an additional point source feed of one of the described surfactants in order to facilitate and optimize separation and recovery of the corn oil. Representative inverting surfactants include ethoxylated nonylphenol, ethoxylated linear alcohols, and the like. Preferred inverting surfactants are ethoxylated linear alcohols.

In at least one embodiment, the polymer is prepared by polymerizing the appropriate monomers at from about 30 degrees C. to about 85 degrees C., over about 1 to about 24 hours, preferably at a temperature of from about 40 degrees C. to about 70 degrees C. over about 3 to about 6 hours.

In at least one embodiment, the aid comprises a dispersion polymer. Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. Water-continuous dispersions of water-soluble polymers are free flowing liquids with product viscosities generally 100-10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

In at least one embodiment, the aid comprises a dry polymer. In at least one embodiment, the aid comprises a gel polymer. The preparation of high molecular weight water soluble polymers as dry powders using a gel polymerization is generally performed as follows: an aqueous solution of water-soluble monomers, generally 20-60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

In a preferred aspect of this invention, the anionic polymer is selected from the group consisting of acrylamide-acrylic acid sodium salt copolymer and acrylamide-2-acrylamido-2-methyl-I-propanesulfonic acid sodium salt copolymer.

In another preferred aspect, acrylamide-acrylic acid sodium salt copolymer and acrylamide-2-acrylamido-2-methyl-1-propanesulfonic acid sodium salt copolymer have an anionic charge of about 30 to about 70 mole percent. In another preferred embodiment, the anionic polymer is acrylamide-sodium acrylate-sodium methacrylate terpolymer. In another preferred embodiment, the acrylamide sodium acrylate-sodium methacrylate terpolymer has an anionic charge of about 1 to about 50 mole percent. The anionic polymers preferably have a reduced specific viscosity of about 10 to about 60 dl/g, more preferably about 15 to about 40 dl/g.

"Reduced specific viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

Wherein n=viscosity of polymer solution; $n_o$=viscosity of solvent at the same temperature; and c=concentration of polymer in solution. As used herein, the units of concentration "c" are (grams/100 ml or g/deciliter). Therefore, the units of RSV are dl/g. The RSV is measured at 30 degree C. The viscosities n and no are measured using a Cannon-Ubbelohde semimicro dilution viscometer, size 75. The viscometer is mounted in a perfectly vertical position in a constant temperature bath adjusted to 30±0.02 degree C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

The effective dosage, addition point(s) and mode of addition of anionic polymer to the suspension process stream can be empirically determined to obtain the proper polymer/particle interaction and optimize the chemical treatment program performance. For higher RSV product samples more mixing is typically required. For lower RSV polymers less mixing is required.

The amount of aid required for optimum dewatering is based upon a number of factors including inverted polymer concentration, thin stillage process stream solids, available polymer/particle mixing energy and the type of dewatering device used. A preferred polymer dosage is about 50 to about 500 ppm of anionic polymer is added to the suspension process stream.

Emulsion polymers are typically inverted as a 0.1 to 5.0 percent by weight solution in clean water according to standard practices for inverting latex flocculants as described herein. The polymer is applied to the suspension stream. Dry anionic polymer flocculants are used in a similar fashion with the product being made up at concentrations of 0.1 to 1.5 percent polymer product according to the standard practices and recommended polymer aging times for preparing dry flocculants.

In some embodiments, the additive includes an acrylamide-sodium AMPS copolymer.

Non-limiting examples of cationic polymers compatible with the gas-floatation systems of the present disclosure include acrylamide sodium acrylate, acrylamide DMAEA.BCQ, acrylamide DMAEA.MCQ, and combinations thereof. In some embodiments, the additive includes acrylamide sodium acrylate. In some embodiments, the additive includes acrylamide DMAEA.BCQ. In some embodiments, the additive includes acrylamide DMAEA.MCQ. In some embodiments, the additive includes acrylamide with DMAEA.BCQ. In some embodiments, the additive includes acrylamide with DMAEA.BCQ and DMAEA.MCQ.

Non-limiting examples of nonionic polymers compatible with the gas-floatation systems of the present disclosure include polyacrylamide. In some embodiments, the additive includes polyacrylamide.

The gas-infusion apparatus 18 of the gas-floatation systems described herein is configured to infuse a gas into the additive to produce a gas-infused additive, and can have various forms or structures dictated by the required specifications of the process or production line with which the gas-floatation system is to be used.

Figure 5:
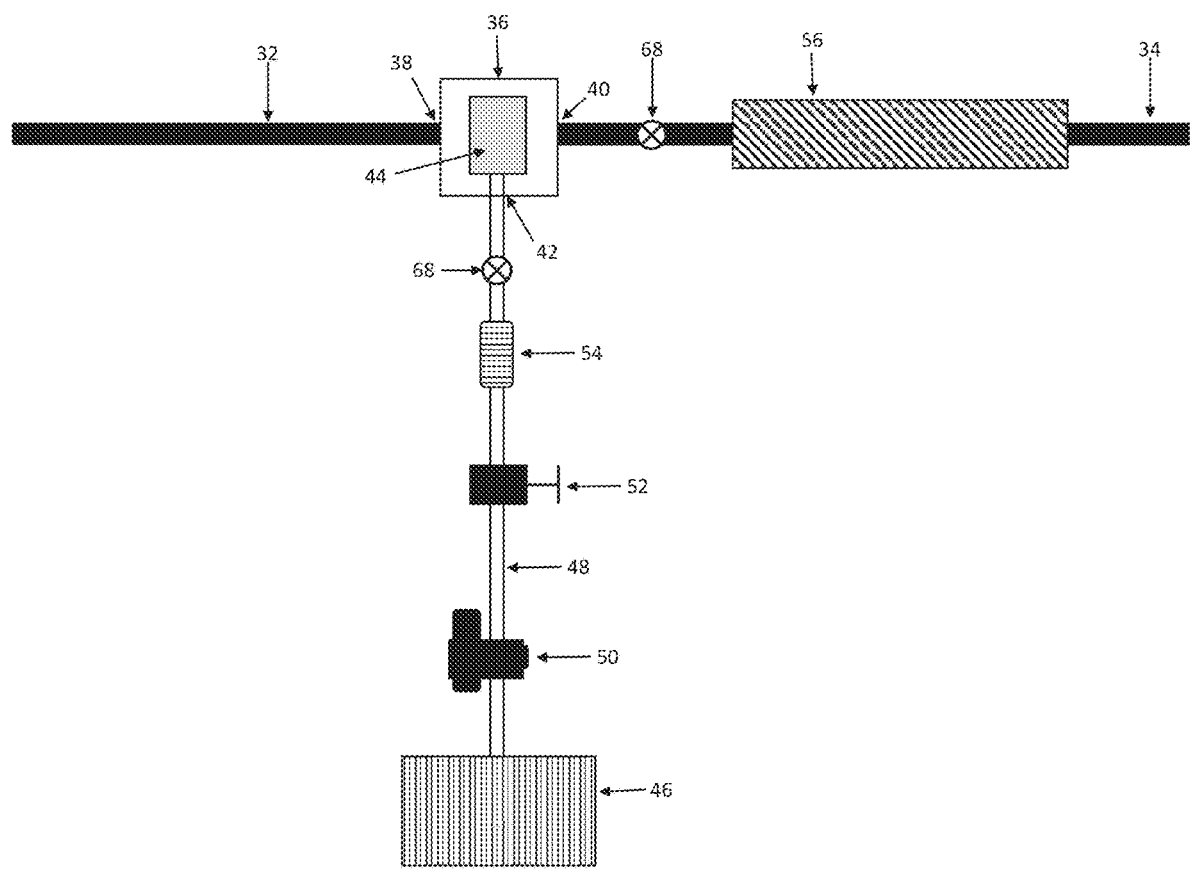
FIG. 5 shows a schematic representation of a gas-infusion apparatus for preparing a gas-infused additive useful within air floatation system for separating solids or oils from liquids within a suspension.
Figure 6:
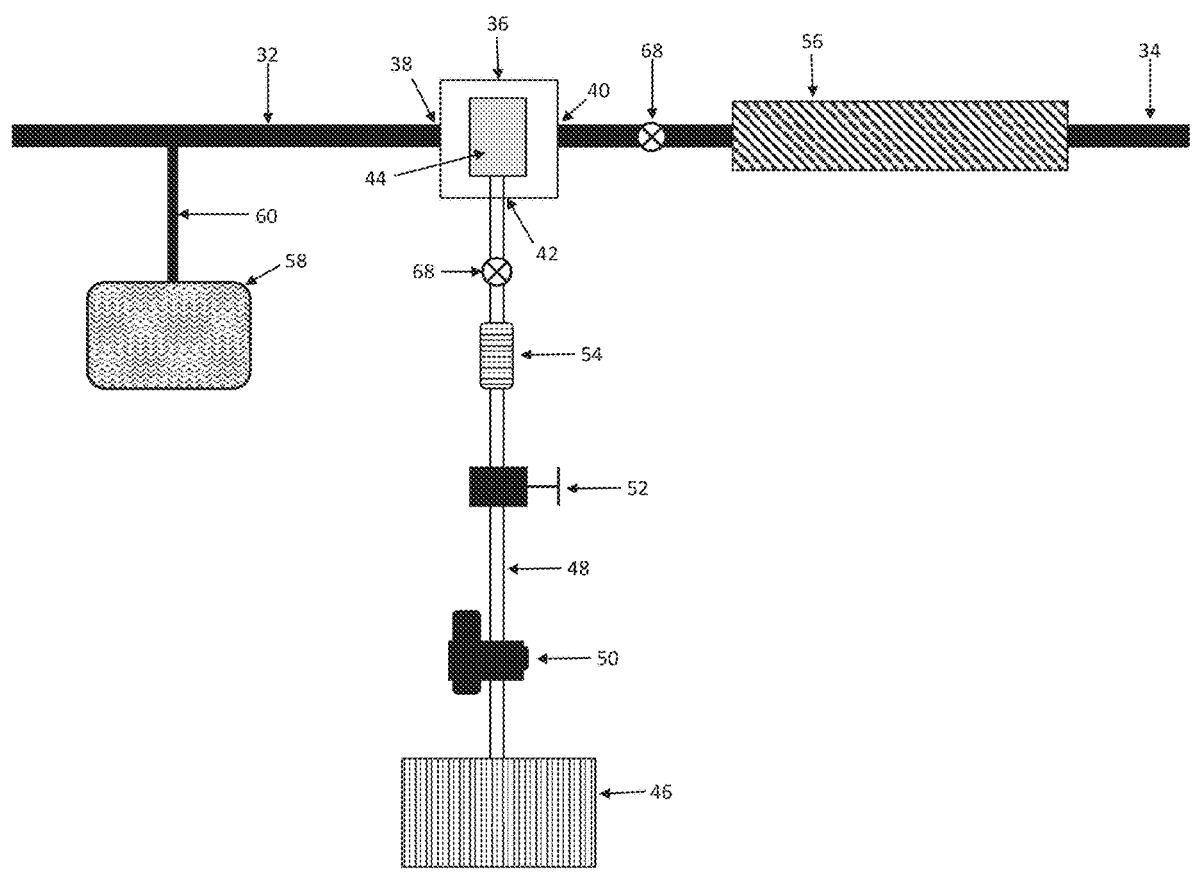
FIG. 6 shows a schematic representation of a gas-infusion apparatus for preparing a gas-infused additive useful within air floatation system for separating solids or oils from liquids within a suspension, where the gas-infusion apparatus includes a drive-water source.

For example, in some embodiments, as shown in FIGS. 5 and 6, the gas-infusion apparatus 18 includes:
 a gas-infusion chamber 36 having an additive inlet 38, an additive outlet 40, and a gas inlet 42;
 a gas diffuser 44 disposed within the gas-infusion chamber 36; and
 a gas source 46 configured to supply a gas to the gas diffuser 44 via a gas-supply conduit 48;
where:
 the gas-infusion chamber 36 is operatively connected to the additive-outlet conduit 32 downstream of the additive supply pump 20 via the additive inlet 38 and to the injection-tap conduit 34 upstream of the additive injection tap 24 via the additive outlet 40; and
 the gas diffuser 44 is operatively connected to the gas source 46 via the gas inlet 42.

The gas-infusion chamber 36 is not particularly limited in form or structure and may be arranged to meet the required specifications of the gas-floatation system 10, as determined by the production line or process in which the system is to be utilized. For example, in some embodiments, the gas-infusion chamber 36 is a pipe tee having three branches corresponding to the additive inlet 38, additive outlet 40, and gas inlet 42. In other embodiments, the gas-infusion chamber is a junction box, or similar structure, having three openings corresponding to the additive inlet 38, additive outlet 40, and gas inlet 42. The gas-infusion chamber 36 can have a unitary construction such that it is formed of a single piece of material (e.g. metal, plastic, or composite materials). Alternatively, the gas-infusion chamber 36 can be formed of two or more pieces joined to produce a gas-tight chamber. The gas-infusion chamber 36 can be sized appropriately based upon the volume of additive required to be infused with the gas based upon the required specifications of the gas-floatation system 10, as determined by the production line or process in which the system is to be utilized.

The gas diffuser 44 is disposed within the gas-infusion chamber 36 and is configured to diffuse a gas supplied thereto by producing microbubbles of the gas. These microbubbles can then be dissolved in the additive as it flows through the gas-infusion chamber 36, thereby producing the gas-infused additive. The gas diffuser 44 may be made of any appropriate material for diffusing the gas into the additive. Likewise, the gas diffuser 44 may be shaped and sized appropriately based upon the specifications of the gas-infusion chamber 36, and to meet the required specifications of the process or production line with which the gas-floatation system is to be used. In some embodiments, the gas diffuser 44 is disposed within the gas-infusion chamber 36, where the gas diffuser 44 is durably attached or otherwise secured to one or more walls within the gas-infusion chamber 36. In other embodiments, the gas diffuser 44 is free floating within the gas-infusion chamber 36. In some embodiments, the gas diffuser 44 is an air stone made of a material selected from metal, ceramic, plastic, a composite, and the like. In some embodiments, the gas diffuser 44 is configured to produce microbubbles of the gas, where the microbubbles have a diameter of about 5 μm to about 100 μm. In some embodiments, the microbubbles have an average diameter of about 40 μm.

The gas source 46 is configured to supply a gas to the gas diffuser 44 via a gas-supply conduit 48 and the gas inlet 42, and can be selected from any gas sources known in the art based on the required specifications of the process or production line with which the gas-floatation system is to be used. For example, in some embodiments, the gas source 46 is an air compressor configured to supply compressed air to the gas-floatation system 10. In other embodiments, the gas source 46 is a compressed gas cylinder that can be sized appropriately based on the required specifications of the system. In some embodiments, the gas source 46 is configured to supply a gas to the gas diffuser 44, where the gas is selected from compressed air and nitrogen. In certain embodiments, the gas source 46 is configured to supply compressed air to the gas diffuser 44.

The gas-infusion apparatus 18 can optionally include one or more additional components such as, but not limited to, a pressure regulator, a valve, a rotameter, or the like. For example, in some embodiments, the gas-infusion apparatus 18 includes a pressure regulator 50 disposed along the gas supply conduit 48 downstream of the gas source 46, which is configured to regulate the pressure of the gas entering the gas-infusion chamber 36. In some embodiments, the gas-infusion apparatus 18 includes a needle valve 52 disposed along the gas supply conduit 48 downstream of the gas source 46, which is configured to regulate the flow of gas into the gas-infusion chamber 36. In some embodiments, the gas-infusion apparatus 18 includes a rotameter 54 disposed along the gas supply conduit 48 downstream of the gas source 46, which is configured to measure the flow rate of gas into the gas-infusion chamber 36. In certain embodiments, the gas-infusion apparatus includes a pressure regulator 50, a needle valve 52, and a rotameter 54 disposed along the gas supply conduit 48, where the pressure regulator 50 is downstream of the gas source 46, the needle valve 52 is downstream of the regulator 50, and the rotameter 54 is downstream of the needle valve 52. In some embodiments, the gas-infusion apparatus 18 further includes a static mixer 56 configured to aid the diffusion of additional air into the additive, where the static mixer 56 is disposed along the injection tap-conduit 34 downstream of the gas-infusion chamber 36.

The amount of dissolved gas present in the gas-infused additive can modulated by altering various parameters within the gas-floatation systems described herein. For example, in some embodiments the amount of dissolved gas present in the gas-infused additive can be controlled by altering the flow rate of additive into the gas-infusion chamber 36 from the additive supply pump 20 by tuning the speed at which the additive supply pump 20 is operated. The amount of dissolved gas present in the gas-infused additive can be reduced by increasing the flow rate of the additive through the gas-infusion chamber 36, or conversely, increased by decreasing the flow rate of the additive through the gas-infusion chamber 36. Without being bound to theory, this is because the amount of gas that will be dissolved in the additive is proportional to the residence time of the additive within the gas-infusion chamber 36. In other words, a longer additive residence time within the gas-infusion chamber provides additional time for gas to dissolve within the additive, as compared to shorter additive residence times. In certain embodiments, the additive supply pump 20 is configured to provide an additive flow rate into the gas-infusion chamber of about 0.5 ppm to about 2,000 ppm.

In other embodiments, the amount of dissolved gas present in the gas-infused additive can be modulated by altering the flow rate of gas into the gas diffuser 44 from the gas source 46 through the use of components such as pressure regulators and needle valves. The amount of dissolved gas present in the gas-infused additive can be reduced by decreasing the flow rate of gas into the gas diffuser, or conversely, increased by increasing the flow rate of gas into the gas diffuser. Without being bound to theory, this is because the amount of gas dissolved in the additive is proportional to the amount and pressure of gas present in the air-infusion chamber 36. In other words, increasing the flow rate of gas into the air-infusion chamber increases the amount and pressure of gas present in the air-infusion chamber 36, which facilitates the dissolution of additional gas into the additive. In certain embodiments, the gas source 46 is configured to supply up to 30 standard cubic feet per hour (SCFH) of gas to the gas diffuser 44. In certain preferred embodiments, the gas source 46 is configured to supply about 10 SCFH to about 20 SCFH to the gas diffuser 44.

In certain embodiments, the amount of dissolved gas present in the gas-infused polymer is controlled by tuning both the flow rate of additive and gas into the gas-infusion chamber 36. The amount of gas present in the gas-infused polymer and other physical properties of the gas-infused polymer can additionally be controlled by altering the viscosity and/or temperature of the additive. The total amount of dissolved gas present in the gas-infused additive can be tuned to meet the required specifications of the gas-floatation system, as determined by the process or production line with which the system is to be used.

The gas-floatation systems of the present disclosure are arranged such that the additive is infused with the gas prior to contacting the suspension or a solution derived from the suspension. Advantageously, this arrangement allows for the supply of additive and gas to the system through a single injection point, reducing the complexity of the system and the number of potential failure points. In some embodiments of the gas-floatation system 10, the system includes a single injection point (i.e. the additive injection tap 24) for simultaneously adding additive and gas to the suspension. In other words, in some embodiments, the gas-infused additive is the sole source of gas injected into the gas floatation system 10. This is not to say that the gas-floatation system 10 is sealed completely to ambient air or that the system is inherently incompatible with a second injection point for adding gas to the suspension. Rather, the invention described herein offers particular advantages with respect to systems having a single injection point, namely that such systems can be improved by incorporating the ability to simultaneously add both an additive and additional dissolved gas to the system at a single point. Importantly, the innovation discovered by the inventors can be utilized with existing systems without requiring complex or costly modifications or upgrades to the existing system. In other embodiments, the gas-floatation system 10 can include a secondary injection point for adding a gas to the suspension, where the secondary injection point can be disposed at any appropriate point within the system, preferably downstream of the pumps present within the system (e.g. the consolidator supply pump 14 and the additive supply pump 20).

The gas-floatation systems described herein can further include a drive-water source 58 configured to supply drive water to the system. The drive-water source 58 can vary with respect to form can be configured to meet the required specifications of the gas-floatation system, as determined by the production line or process in which the system is to be used. For example, in some embodiments, the drive-water source includes a drive water pump configured to supply drive water to the gas-floatation system 10 from a drive water reservoir disposed upstream of the drive water pump. The drive water reservoir may be sized and shaped appropriately to meet the required specifications of the system. For example, in certain embodiments, the drive water reservoir may have a capacity of about 1 gallon to about 10,000 gallons of water. In other embodiments, the drive-water source does not require an active drive water pump, and instead includes a connection to a water line (e.g. a municipal or non-potable water line), where the drive water flow rate can be controlled through the use of one or more valves. In yet other embodiments, the drive-water source includes a drive water pump configured to supply drive water from a connected water line (e.g. a municipal or non-potable water line).

Figure 2:
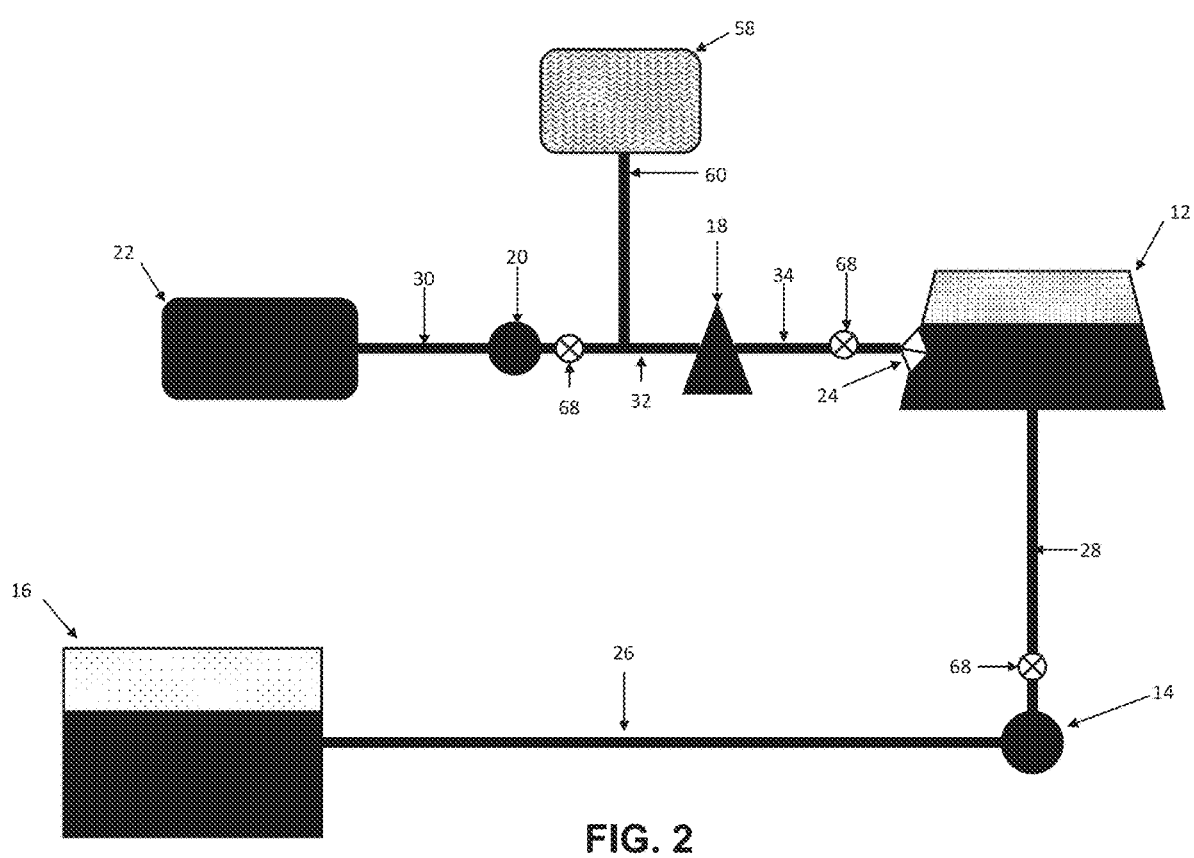
FIG. 2 shows a schematic representation of a gas-floatation system for separating solids or oils from liquids within a suspension, in which a gas-infused additive is injected into the suspension within a consolidator.

In certain embodiments, such as the embodiment depicted in FIG. 2, the drive-water source 58 may be disposed downstream of the additive supply pump 20 and upstream of the gas-infusion apparatus 18, such that the drive water increases the flow velocity of the additive into the gas-infusion apparatus 18. In other words, in some embodiments, the drive-water source 58 is operatively connected in-line with the additive-outlet conduit 32 via a drive water conduit 60. Likewise, the drive-water source 58 can supply additional flow velocity to the gas-infused additive, by virtue of the increased flow rates through the gas-infusion apparatus 18. Thus, in embodiments equipped with a drive-water source 58, the drive-water source 58 provides an additional point of control for tuning the amount of dissolved gas present in the gas-infused additive given the effect of the drive-water source 58 on the flow rate of the additive through the gas-infusion apparatus 18.

Figure 3:
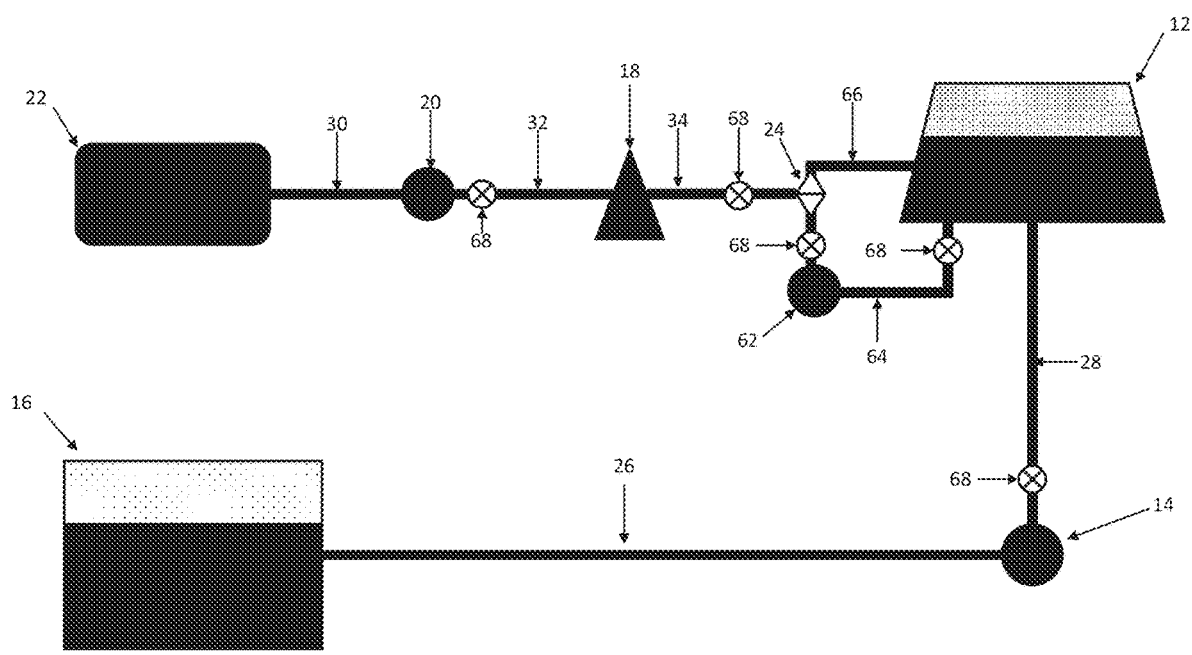
FIG. 3 shows a schematic representation of a gas-floatation system for separating solids or oils from liquids within a suspension, in which a gas-infused additive is injected into partially clarified liquid derived from the suspension within a recirculation loop.
Figure 4:
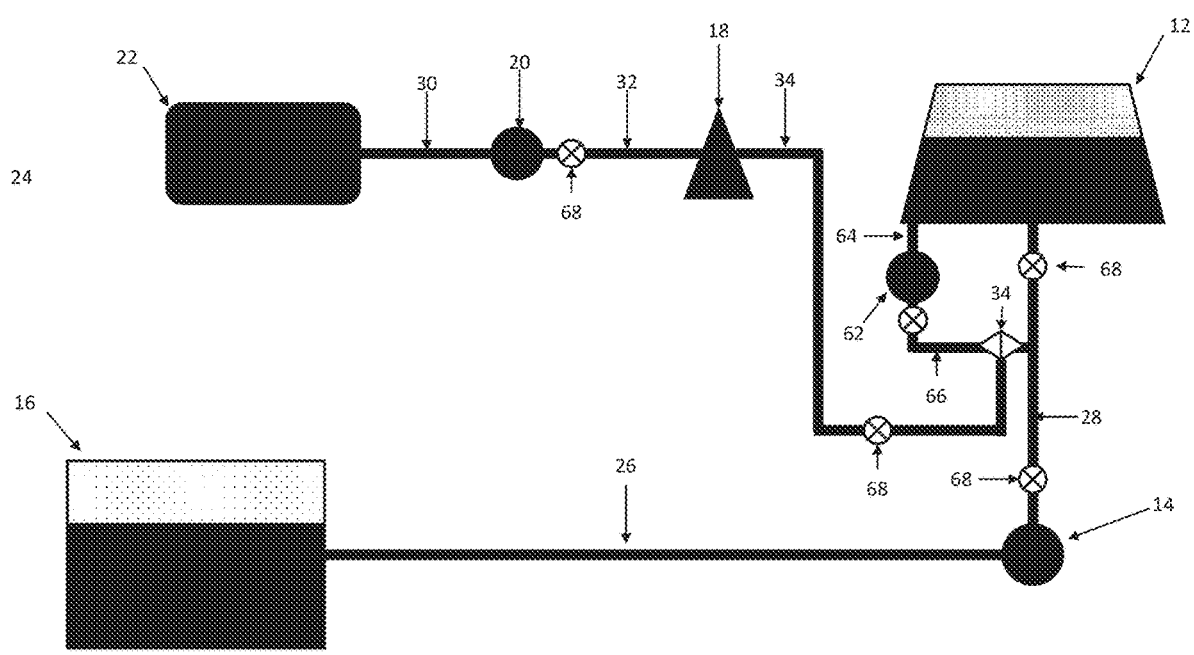
FIG. 4 shows a schematic representation of a gas-floatation system for separating solids or oils from liquids within a suspension, in which a gas-infused additive is injected into partially clarified liquid derived from the suspension and subsequently mixed with the suspension as it enters a consolidator.

The gas-floatation systems disclosed herein can also include a recirculating pump 62 configured to recirculate the suspension or a liquid derived therefrom within the system, as shown in FIGS. 3 and 4. The recirculating pump 62 is not particularly limited with respect to form or structure and can be selected from any appropriate recirculating pump known in the art by one of ordinary skill without undue experimentation.

In some embodiments, the recirculating pump 62 is configured to draw a partially clarified liquid from the consolidator 12 via an outlet located on a surface of the consolidator 12 and to return the partially clarified liquid to the consolidator 12. In such embodiments, the recirculating pump 62 is operatively connected to the outlet of the consolidator 12 via a recirculation-inlet conduit 64. In certain embodiments, the recirculating pump 62 is configured to return the partially clarified liquid to the consolidator 12 via an inlet located on a surface of the consolidator 12 via a recirculation-outlet conduit 66. In other words, in some embodiments, the recirculating pump 62 is configured to recirculate the partially clarified liquid in a loop that begins and ends with direct connections to the consolidator 12, as shown in FIG. 3. In certain other embodiments, the recirculating pump 62 is configured to return the partially clarified liquid to the consolidator via the suspension-outlet conduit 28, where the recirculation-outlet conduit 66 is operatively connected to the suspension-outlet conduit 28, as shown in FIG. 4.

The additive injection tap 24 is configured to inject the gas-infused additive into the suspension, or a liquid derived from the suspension. The additive injection tap 24 is disposed downstream of the consolidator supply pump 14 and is operatively connected to the gas-infusion apparatus 18 via the injection-tap conduit 34. The additive injection tap 24 can vary with respect to form and can be configured to meet the required specifications of the gas-floatation system, as determined by the production line or process with which the system is to be used. In some embodiments, the additive injection tap 24 is a pipe tee where one branch of the tee is operatively connected to the gas-infusion apparatus 18 and the remaining two branches are connected in-line with one of the conduits through which the suspension or a liquid derived therefrom flows. In certain embodiments, a nozzle or needle may be disposed within the pipe tee, where the nozzle is operatively connected to the gas-infusion apparatus, such that the gas-infused additive flows from the nozzle and into the pipe tee between the branches connected in-line with the conduit through which the suspension or a liquid derived therefrom flows. In other embodiments, the additive injection tap 24 is a nozzle or needle that is operatively connected in-line with a conduit through which the suspension or a liquid derived therefrom flows.

Generally, the gas-floatation systems of the disclosure are arranged such that the additive injection tap 24 is positioned downstream of the pumps (e.g. the consolidator supply pump 14 and recirculating pump 62) present within the gas-floatation system 10. In this manner, the various pumps of the gas-floatation system are protected from exposure to dissolved gases present in the gas-infused additive, thereby advantageously protecting the pumps from issues such as cavitation corrosion.

The gas-floatation systems of the present disclosure can have multiple arrangements with respect to the location of the additive injection tap 24, which can be selected based upon the required specifications of the system, as determined by the production line or process with which the system is to be used. For example, as shown in FIG. 1, in some embodiments, the additive injection tap 24 is operatively connected in-line with the suspension-outlet conduit 28, such that the gas-infused additive is added to the suspension as it flows into the consolidator 12. Alternatively, in other embodiments, the additive injection tap 24 is operatively connected directly to the consolidator 12, such that the gas-infused additive is added to the suspension within the consolidator 12, as shown in FIG. 2. In certain embodiments with the configuration shown in FIG. 2, the system includes a drive-water source 58, as described above, where the drive-water source 58 is operatively connected to the additive-outlet conduit 32 downstream of the additive supply pump 20 and upstream of the gas-infusion apparatus 18. In other embodiments, the additive injection tap 24 is operatively connected in-line with the recirculation-outlet conduit 66, where the recirculation-outlet conduit is operatively connected to an inlet on the surface of the consolidator 12, such that the gas-infused additive is injected into the partially clarified liquid as it is returned to the consolidator 12, as shown in FIG. 3. In yet other embodiments, the additive injection tap 24 is operatively connected in-line with the recirculation-outlet conduit 66, where the recirculation-outlet conduit is operatively connected in line with the suspension-outlet conduit 28, such that the gas-infused additive is injected into the partially clarified liquid as it is returned to the consolidator 12, as shown in FIG. 4.

The gas-floatation systems described herein can further include one or more check valves 68 configured to prevent the back-flow of a liquid through the system. These check valves can be included in order to protect the various components of the gas-floatation system 10 from potential damage resulting from back-flow or a loss of pressure within the system. As used herein, the term "check valve" refers to any appropriate valve that restricts the flow of a liquid to a one-way flow and prevents the back-flow of the liquid through the valve. The check valve may be a passive valve, for example, a swing or ball check valve, or may be an active valve, such as a solenoid-controlled valve.

For example, in some embodiments, the gas floatation system 10 includes a check valve 68 disposed along the suspension-outlet conduit 28 downstream of the consolidator supply pump 14 that is configured to prevent the back-flow of the suspension into the consolidator supply pump 14.

In some embodiments, the gas floatation system 10 includes a check valve 68 disposed along the additive-outlet conduit 32 downstream of the additive supply pump 20 that is configured to prevent the back-flow of the additive, gas, or gas-infused additive into the additive supply pump 20.

In some embodiments, the gas floatation system 10 includes a check valve 68 disposed along the injection-tap conduit 34 downstream of the gas-infusion apparatus 18 and upstream of the additive injection tap 24 that is configured to prevent the back-flow of the gas-infused additive and/or the suspension (or a liquid derived therefrom) into the gas-infusion apparatus 18.

In some embodiments, the gas floatation system 10 includes a check valve 68 disposed along the gas-supply conduit 48 downstream of the gas source 46 and upstream of the gas-infusion chamber 36 that is configured to prevent the back-flow of additive or gas-infused additive into the gas-supply conduit 48. In certain embodiments having one or more additional components including a pressure regulator 50, a needle valve 52, and/or a rotameter 54 disposed along the gas-supply conduit 48, the check valve 68 is disposed downstream all of the additional components disposed along the gas-supply conduit 48 and upstream of the gas-infusion chamber 36. In such embodiments, the check valve 68 is configured to protect the pressure regulator 50, needle valve 52, and/or rotameter 54 from the backflow of additive and/or gas-infused additive into the pressure regulator, needle valve, and/or rotameter.

In some embodiments having a recirculating pump 62, the gas floatation system 10 includes a check valve 68 disposed along the recirculation-outlet conduit 66 downstream of the recirculating pump 62 that is configured to prevent the back-flow of partially clarified liquid and/or gas-infused additive into the recirculating pump 62.

Figure 1B:
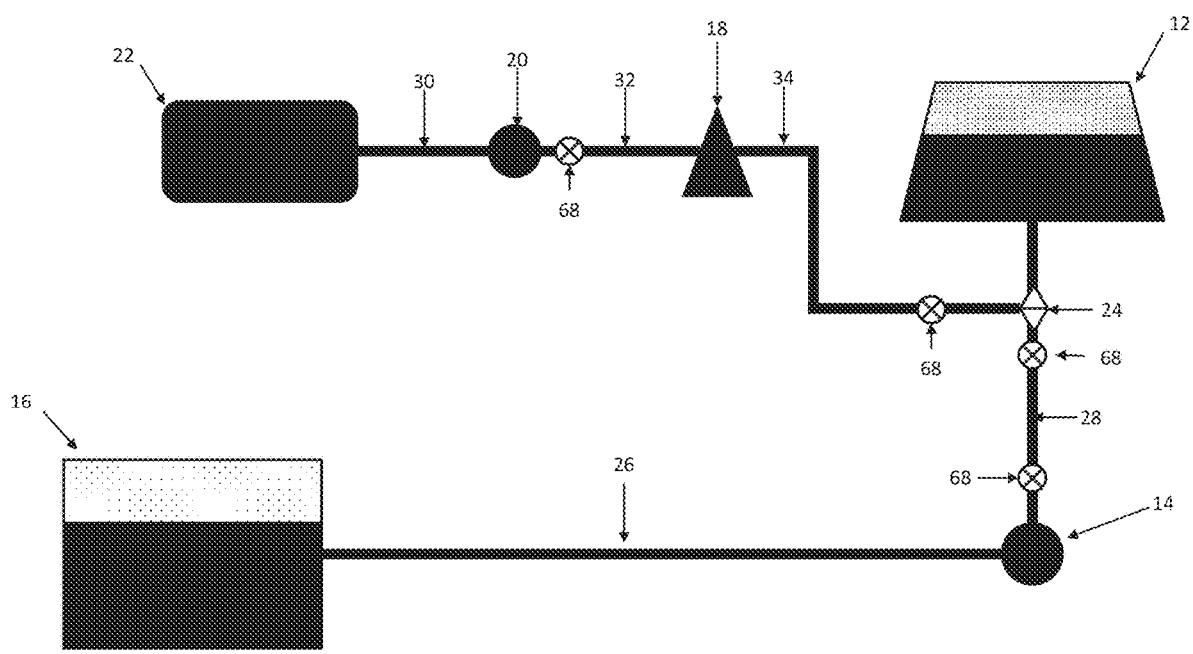
FIG. 1B shows a schematic representation of a gas-floatation system for separating solids or oils from liquids within a suspension, in which a gas-infused additive is injected into the suspension as it enters a consolidator.
Figure 4B:
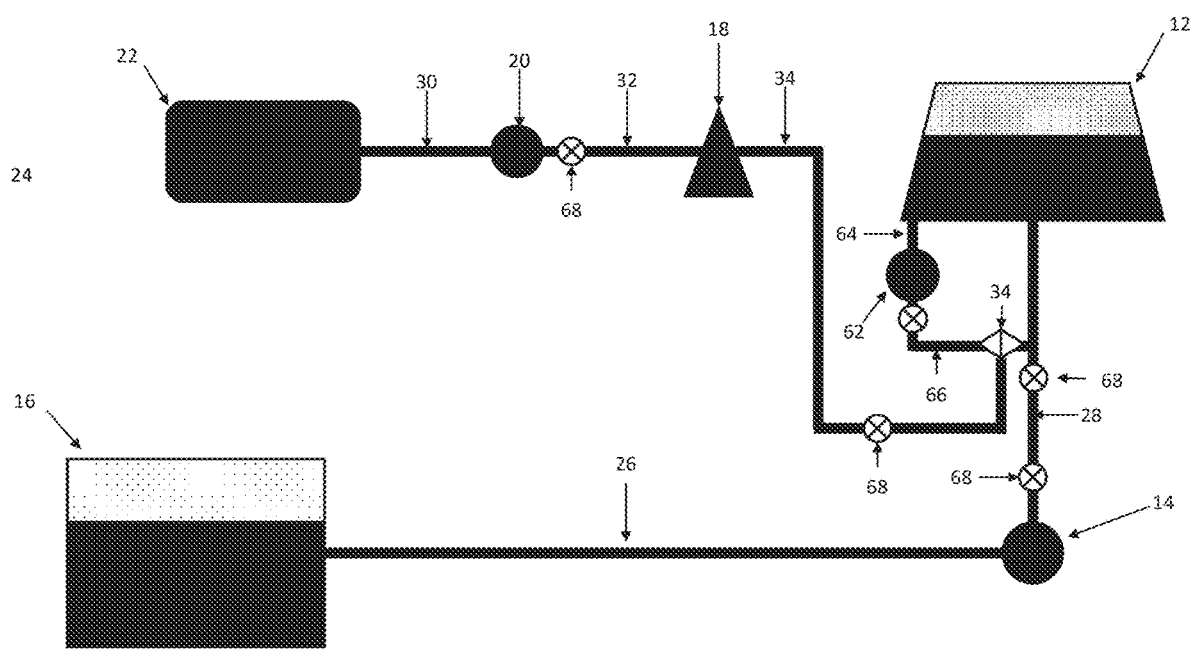
FIG. 4B shows a schematic representation of a gas-floatation system for separating solids or oils from liquids within a suspension, in which a gas-infused additive is injected into partially clarified liquid derived from the suspension and subsequently mixed with the suspension as it enters a consolidator.

In some embodiments, the gas floatation system 10 includes a check valve 68 configured to maintain pressure within the conduits upstream of the consolidator 12. Without being bound to theory, maintaining pressure within the conduits upstream of the consolidator is beneficial for maintaining a small size of the microbubbles, prior to entry into the consolidator. In certain embodiments, particularly where the injection tap 24 is located distantly from the consolidator 12, the check valve 68 is located downstream of the injection tap 24 and upstream of the consolidator 12, as shown in FIGS. 1, 3, and 4. In certain other embodiments, particularly where the injection tap 24 is located in close proximity to the consolidator 12, the check valve 68 is located upstream of both the injection tap 24 and the consolidator 12, as shown in FIGS. 1B and 4B.

It will be appreciated by those of ordinary skill that the foregoing arrangements of the gas-floatation system 10 do not represent an exhaustive list of all possible arrangements. Other plausible arrangements consistent with the gas-floatation systems and methods described herein exist and are considered to be within the spirit and scope of the described invention.

2. Gas-Infusion Devices/Apparatuses of the Disclosure

In another aspect, the present disclosure relates to an apparatus for infusing an additive with a gas to produce a gas-infused additive that is useful for separating solids or oils from a liquid within a suspension. The gas-infusion apparatuses described herein can be provided as an add-on component that can be incorporated into an existing system for separating solids or oils from a liquid within a suspension, provided that the system separates the solids or oils from the liquid via a gas-floatation method. Accordingly, the gas-infusion apparatus is useful in a number of industries including, but not limited to, the automotive, food and beverage, paper manufacturing, wastewater treatment, and mining industries. For example, the gas-floatation apparatus of the disclosure is useful in improving systems and processes for separating paint particulates from water in suspensions produced from paint automotive paint spray booths via processes intended to capture paint overspray.

Specifically, as shown in FIGS. 5 and 6, the gas-infusion apparatus 18 for infusing an additive with a gas to produce a gas-infused additive includes:

- a gas-infusion chamber 36 having an additive inlet 38, an additive outlet 40, and a gas inlet 42;
- a gas diffuser 44 disposed within the gas-infusion chamber 36; and
- a gas source 46 configured to supply the gas to the gas diffuser 44, where the gas source 46 is operatively connected to the gas diffuser 44 via a gas supply conduit 48 and the gas inlet 42;

where:

- the gas-infusion apparatus 18 is configured to be appended to a system having an additive source and a floatation consolidator, where the additive source is configured to be operatively connected to the gas-infusion chamber 36 via the additive inlet 38 and the floatation consolidator is configured to be operatively connected to the gas-infusion chamber 36 via the additive outlet 40; and
- the gas-infusion apparatus 18 is configured such that the additive has a sequential flow path from the additive source, through the gas-infusion chamber 36, and into the floatation consolidator, where the additive is infused with the gas prior to contacting a suspension or a liquid derived from the suspension.

The gas-infusion chamber 36 is not particularly limited with respect to form or structure and may be configured to meet the required specifications of the gas-infusion apparatus 18, as determined by the system to which the apparatus is to be appended. In some embodiments, the gas-infusion chamber 36 is analogous to the gas-infusion chamber described above with respect to the gas-floatation systems of the disclosure.

The gas diffuser 44 is disposed within the gas-infusion chamber 36 and is configured to diffuse a gas supplied thereto by producing microbubbles of the gas. These microbubbles are then dissolved in the additive as it flows through the gas-infusion chamber 36, thereby producing the gas-infused additive. The gas diffuser 44 may be made of any appropriate material for diffusing the gas into the additive. Likewise, the gas diffuser 44 may be shaped and sized appropriately based upon the characteristics of the gas-infusion chamber 36 and to meet the required specifications of the system to which the gas-infusion apparatus 18 is to be appended. In some embodiments, the gas diffuser 44 is analogous to the gas diffuser described above with respect to the gas-floatation systems of the disclosure.

The gas source 46 is configured to supply a gas to the gas diffuser 44 via a gas-supply conduit 48 and the gas inlet 42, and can be selected from an assortment of gas supplies known in the art based on the required specifications of the system to which the gas-infusion apparatus 18 is to be appended. In some embodiments, the gas source 46 is analogous to the gas supply source described above with respect to the gas-floatation systems of the disclosure. In some embodiments, the gas source 46 is configured to supply a gas to the gas diffuser 44, where the gas is selected from compressed air and nitrogen. In certain embodiments, the gas source 46 is configured to supply compressed air to the gas diffuser 44.

The gas-infusion apparatus 18 can optionally include one or more additional components including, but not limited to, pressure regulators, valves, rotameters, and the like. For example, in some embodiments, the gas-infusion apparatus 18 includes a pressure regulator 50 disposed along the gas supply conduit 48 downstream of the gas source 46, which is configured to regulate the pressure of the gas entering the gas-infusion chamber 36. In some embodiments, the gas-infusion apparatus 18 includes a needle valve 52 disposed along the gas supply conduit 48 downstream of the gas source 46, which is configured to regulate the flow of gas into the gas-infusion chamber 36. In some embodiments, the gas-infusion apparatus 18 includes a rotameter 54 disposed along the gas supply conduit 48 downstream of the gas source 46, which is configured to measure the flow rate of gas into the gas-infusion chamber 36. In certain embodiments, the gas-infusion apparatus includes a pressure regulator 50, a needle valve 52, and a rotameter 54 disposed along the gas supply conduit 48, where the pressure regulator 50 is downstream of the gas source 46, the needle valve 52 is downstream of the regulator 50, and the rotameter 54 is downstream of the needle valve 52. In some embodiments, the gas-infusion apparatus 18 further includes a static mixer 56 configured to aid the diffusion of additional air into the additive, where the static mixer 56 is operatively connected to the additive outlet 40 upstream of the floatation consolidator.

The gas-infusion apparatus 18 is configured to be appended to a system having an additive source and a floatation consolidator, where the additive source is configured to be operatively connected to the gas-infusion chamber 36 via the additive inlet 38 and the floatation consolidator is configured to be operatively connected to the gas-infusion chamber 36 via the additive outlet 40. In other words, the gas-infusion apparatus 18 can be provided as an add-on component that can be incorporated into an existing system, for example, a system configured to separate solids or oils from a liquid within a suspension via gas-floatation methods. In some embodiments, the system can include one or more additional components selected from, but not limited to, a consolidator supply pump, an additive supply pump, an additive injection tap, a drive-water source, a recirculating pump, and one or more conduits configured to operatively connect the components of the system. In some embodiments, the gas-infusion apparatus 18 is included as a component within systems analogous to the gas-floatation systems of the disclosure described above.

The gas-infusion apparatus 18 includes an additive inlet 38 configured to be operatively connected to an additive source, which can, in some embodiments, be analogous to the additive source 22 described above with respect to the gas-floatation systems of the disclosure. In some embodiments, the additive source includes an additive supply pump configured to supply the additive to the gas-infusion apparatus 18 from the additive source, which can be analogous to the additive supply pump 20 described above with respect to the gas-floatation systems of the disclosure. Likewise, the gas-infusion apparatuses described herein are compatible with the additives described above with respect to the gas-floatation systems of the disclosure.

The gas-infusion apparatus 18 additionally includes an additive outlet 40 configured to be operatively connected to a floatation consolidator, where the floatation consolidator is configured to separate solids or oils from a liquid within a suspension via gas floatation. The floatation consolidator is, in some embodiments, analogous to the consolidator 12 described above with respect to the gas-floatation systems of the disclosure. In some embodiments, the floatation consolidator is configured to separate solids or oils from a liquid within a suspension via a process selected from the group consisting of dissolved air floatation, induced gas floatation, and suspended air floatation. In certain embodiments, the floatation consolidator is configured to separate solids or oils from a liquid within a suspension via dissolved air floatation.

The gas-infusion apparatus 18 can be configured to be operatively connected to the floatation consolidator in systems with a variety of organizational schemes or arrangements. It will be appreciated by those of ordinary skill in the art that, though the gas-infusion apparatus 18 must ultimately be connected to a floatation consolidator, the apparatus need not necessarily be directly connected to the floatation consolidator. Rather, the gas-infusion apparatus 18 can be configured to operatively connect to the consolidator via any number of intermediate conduits or components of the system. Stated another way, the gas-infusion chamber 36 of the apparatus includes an additive outlet 40 that is configured to allow a flow of the gas-infused additive from the gas-infusion chamber 36 and into the system, where the flow of the gas-infused additive terminates in the floatation consolidator.

The gas-infusion apparatus 18 is additionally configured such that the additive has a sequential flow path from the additive source, through the gas-infusion chamber 36, and into the floatation consolidator, where the additive is infused with the gas prior to contacting a suspension or a liquid derived from the suspension, within the system to which the apparatus is appended. Advantageously, this configuration allows for the supply of additive and gas to the system through a single injection point, reducing the complexity of the system and the number of potential failure points. In some embodiments, the gas-infusion apparatus is configured to be appended to a system having a single injection point for simultaneously adding both additive and gas to suspensions and liquids within the system. In other words, in some embodiments, the gas-infusion apparatus is configured to be appended to a system where the gas-infused additive is the sole source of gas injected into the system. In other embodiments, the gas-infusion apparatus 18 can include a secondary injection point for adding a gas to the suspension disposed at any appropriate point within the system.

The amount of dissolved gas present in the gas-infused additive produced by the gas-infusion apparatus 18 can be tuned or otherwise controlled by altering various parameters of the gas-infusion apparatus 18. For example, in some embodiments the amount of dissolved gas present in the gas-infused additive can be controlled by altering the flow rate of additive into the gas-infusion chamber 36. More precisely, the amount of dissolved gas present in the gas-infused additive can be reduced by increasing the flow rate of the additive through the gas-infusion chamber 36, or conversely, increased by decreasing the flow rate of the additive through the gas-infusion chamber 36. In certain embodiments, the additive can be supplied to the gas-infusion chamber 36 with a flow rate of about 0.5 ppm to about 2,000 ppm.

In other embodiments, the amount of dissolved gas present in the gas-infused additive produced by the gas-infusion apparatus 18 can be controlled by altering the flow rate of gas into the gas diffuser 44 from the gas source 46 through the use of components such as pressure regulators and needle valves. More precisely, the amount of dissolved gas present in the gas-infused additive can be reduced by decreasing the flow rate of gas into the gas diffuser 44, or conversely, increased by increasing the flow rate of gas into the gas diffuser 44. In certain embodiments, the gas source 46 is configured to supply up to 60 standard cubic feet per hour (SCFH) of gas to the gas diffuser 44. In certain preferred embodiments, the gas source 46 is configured to supply about 10 SCFH to about 20 SCFH to the gas diffuser 44.

In certain embodiments, the amount of dissolved gas present in the gas-infused polymer is controlled by tuning both the flow rate of additive and gas into the gas-infusion chamber 36. The amount of gas present in the gas-infused polymer and other physical properties of the gas-infused polymer can additionally be controlled by altering the viscosity and/or temperature of the additive.

The gas-infusion apparatuses described herein can further include a drive-water source 58 configured to supply drive water to the apparatus. The drive-water source 58 can vary with respect to form and structure to meet the required specifications of the gas-infusion apparatus 18 based on the system to which the apparatus is to be appended. In some embodiments, the drive-water source 58 is analogous to the drive-water source described above with respect to the gas-floatation systems of the disclosure.

In certain embodiments, such as the embodiment depicted in FIG. 6, the drive-water source 58 may be disposed upstream of the gas-infusion chamber 36 and downstream of the additive source, such that the drive water increases the flow velocity of the additive into the gas-infusion chamber 36. In some embodiments, the drive-water source 58 is operatively connected to the gas-infusion apparatus 18 via a drive water conduit 60. Likewise, the drive-water source 58 can supply additional flow velocity to the gas-infused additive as it exits the gas-infusion chamber 36, by virtue of the increased flow rates through the gas-infusion chamber 36. Thus, in embodiments equipped with a drive-water source 58, the drive-water source 58 provides an additional point of control for tuning the amount of dissolved gas present in the gas-infused additive, given the effect of the drive-water source 58 on the flow rate of the additive through the gas-infusion chamber 36.

The gas-infusion apparatuses described herein can further include one or more check valves 68 configured to prevent the back-flow of a liquid through the apparatus. These check valves can be included in order to protect the various components of the gas-infusion apparatus 18 from potential damage resulting from back-flow or a loss of pressure within the system.

In some embodiments, the gas-infusion apparatus 18 includes a check valve 68 disposed upstream of the additive inlet 38 that is configured to prevent the back-flow of the additive, gas, or gas-infused additive into the system, for example, into an additive supply source or additive supply pump.

In some embodiments, the gas-infusion apparatus 18 includes a check valve 68 disposed downstream of the additive outlet 40 that is configured to prevent the back-flow of the gas-infused additive, and/or a liquid or suspension present in the system, into the into the gas-infusion apparatus 18.

In some embodiments, the gas-infusion apparatus 18 includes a check valve 68 disposed along the gas-supply conduit 48 downstream of the gas source 46 and upstream of the gas-infusion chamber 36 that is configured to prevent the back-flow of additive or gas-infused additive into the gas-supply conduit 48. In certain embodiments having one or more additional components disposed along the gas-supply conduit 48, such as a pressure regulator 50, a needle valve 52, and/or a rotameter 54, the check valve 68 is disposed downstream of the additional components and upstream of the gas-infusion chamber 36. In such embodiments, the check valve 68 is configured to protect the optional components from the backflow of additive and/or gas-infused additive into the gas-supply conduit 48.

It will be appreciated by those of ordinary skill that the foregoing arrangements of the gas-infusion apparatus 18 do not represent an exhaustive list of all possible arrangements. Other plausible arrangements consistent with the gas-infusion apparatuses and methods described herein exist, and are considered to be within the spirit and scope of the described invention.

3. Processes of the Disclosure

In another aspect, the present disclosure relates to a process that uses a gas-infused additive to separate solids or oils from a liquid within a suspension. The processes described herein are useful in a number of industries including, but not limited to, the automotive, food and beverage, paper manufacturing, wastewater treatment, and mining industries. The processes of the disclosure are generally useful for separating solids or oils from a liquid within a suspension via gas floatation. For example, the processes described herein are useful for separating paint particulates from water in suspensions produced in paint automotive paint spray booths via methods intended to capture paint overspray.

Specifically, a process for separating solids or oils from a liquid within a suspension includes, or includes the steps of:
dissolving a gas in an additive to produce a gas-infused additive;
injecting the gas-infused additive into the suspension;
mixing the gas-infused additive with the suspension; and
separating the solids or oils from the liquid via a method selected from the group consisting of dissolved air floatation, induced gas floatation, and suspended air floatation, where the gas is dissolved in the additive prior to the additive contacting the suspension or a liquid derived from the suspension.

In some processes, the step of dissolving a gas in an additive to produce a gas-infused additive is achieved through the use of the gas-infusion apparatuses described herein.

In some processes, the step of injecting the gas-infused additive into the suspension is achieved through the use of the gas-floatation systems described herein. In certain processes, the step of injecting the gas-infused additive into the suspension is performed at a single injection point within a system configured to separate solids or oils from a liquid within a suspension via a gas-floatation method.

In some processes, the step of mixing the gas-infused additive with the suspension is achieved via flow-induced turbulence of the gas-infused additive and suspension through a system configured to separate solids or oils from a liquid within a suspension via a gas-floatation method. In other processes, the step of mixing the gas-infused additive with the suspension is achieved through the use of static mixers configured to enhance the degree of flow-induced turbulence. In yet other processes, the step of mixing the gas-infused additive with the suspension is achieved through the use of active mixing, for example, via mechanical stirrers or similar components readily known to those of ordinary skill in the art.

In some embodiments of the process, the gas-infused additive is the sole source of gas injected into the suspension for facilitating the separation of the solids or oils from the liquid within the suspension via a gas-floatation method.

In some embodiments of the process, the additive can include a detackifying agent, a flocculation agent, a coagulation agent, an anionic polymer, a cationic polymer, a nonionic polymer, or a mixture thereof. For example, in certain embodiments, the additive can be selected from the compatible additives described above with respect to the gas-floatation systems of the disclosure.

All of the compositions, systems, apparatuses, and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition, system, or apparatus disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A gas-floatation system for separating solids or oils from a liquid within a suspension, the gas-floatation system comprising:
    a consolidator configured to separate the solids or oils from the liquid;
    a consolidator supply pump configured to supply the suspension to the consolidator from a suspension source;
    a gas-infusion apparatus configured to infuse a gas into an additive to produce a gas-infused additive;
    an additive supply pump configured to supply the additive to the gas-infusion apparatus from an additive source; and
    an additive injection tap configured to inject the gas-infused additive into the suspension or a liquid derived from the suspension;
    wherein:
    the consolidator supply pump is operatively connected to the suspension source via a suspension-inlet conduit and to the consolidator via a suspension-outlet conduit, and is configured to supply the suspension to the consolidator from the suspension source via the suspension-inlet and suspension-outlet conduits;
    the additive supply pump is operatively connected to the additive source via an additive-inlet conduit and to the gas-infusion apparatus via an additive-outlet conduit, and is configured to supply the additive to the gas-infusion apparatus from the additive source via the additive-inlet and additive-outlet conduits;
    the additive injection tap is located downstream of the consolidator supply pump and is operatively connected to the gas-infusion apparatus via an injection-tap conduit; the additive injection tap is in-line with the suspension-outlet conduit and is configured to inject the gas-infused additive into the suspension as the suspension is supplied to the consolidator; and
    the gas-floatation system is configured to infuse the additive with the gas prior to the additive contacting the suspension or a liquid derived from the suspension.

2. The gas-floatation system of claim 1, further comprising a drive-water source configured to supply drive water to the additive, wherein the drive-water source is operatively connected in-line with the additive-outlet conduit, upstream of the gas-infusion apparatus.

3. The gas-floatation system of claim 1, wherein the consolidator is a floatation consolidator configured to separate the solids or oils from the liquid via a process selected from the group consisting of dissolved air floatation, induced gas floatation, and suspended air floatation.

4. The gas-floatation system of claim 1, wherein the gas-infused additive is a sole source of gas injected into the suspension.

5. The gas-floatation system of claim 1, wherein the additive is selected from the group consisting of a detackifying agent, a flocculation agent, a coagulation agent, an anionic polymer, a cationic polymer, a nonionic polymer, and mixtures thereof.

6. The gas-floatation system of claim 1, further comprising:
a recirculating pump configured to draw a partially clarified liquid from the consolidator via an outlet located on a surface of the consolidator and return the partially clarified liquid to the consolidator, wherein the recirculating pump is operatively connected to the outlet via a recirculation-inlet conduit.

7. The gas-floatation system of claim 6, wherein the recirculating pump is configured to return the partially clarified liquid to the consolidator via an inlet located on the surface of the consolidator, wherein the recirculating pump is operatively connected to the inlet via a recirculation-outlet conduit, and the additive injection tap is in-line with the recirculation-outlet conduit and is configured to inject the gas-infused additive into the partially clarified liquid as it is returned to the consolidator via the inlet.

8. The gas-floatation system of claim 6, wherein the recirculating pump is configured to return the partially clarified liquid to the consolidator via the suspension-outlet conduit, wherein the recirculating pump is operatively connected to the suspension-outlet conduit via a recirculation-outlet conduit, and the additive injection tap is in-line with the recirculation-outlet conduit and is configured to inject the gas-infused additive into the partially clarified liquid as it is returned to the consolidator via the suspension-outlet conduit.

9. The gas-floatation system of claim 1, wherein the gas-infusion apparatus comprises:
a gas-infusion chamber comprising an additive inlet, an additive outlet, and a gas inlet;
a gas diffuser disposed within the gas-infusion chamber; and
a gas source configured to supply the gas to the gas diffuser,
wherein:
the gas-infusion chamber is operatively connected to the additive-outlet conduit downstream of the additive supply pump via the additive inlet and to the injection-tap conduit upstream of the additive injection tap via the additive outlet; and
the gas diffuser is operatively connected to the gas source via the gas inlet.

10. The gas-floatation system of claim 9, wherein the gas source is configured to supply the gas to the gas diffuser with a flow rate of about 1 standard cubic foot per hour to about 30 standard cubic feet per hour.

11. A gas-infusion apparatus for infusing an additive with a gas to produce a gas-infused additive, the gas-infusion apparatus comprising:
a gas-infusion chamber comprising an additive inlet, an additive outlet, and a gas inlet;
a gas diffuser disposed within the gas-infusion chamber; and
a gas source configured to supply the gas to the gas diffuser, wherein the gas source is operatively connected to the gas diffuser via a gas-supply conduit and the gas inlet;
wherein:
the gas-infusion apparatus is configured to be appended to a system comprising an additive source and a floatation consolidator, wherein the additive source is configured to be operatively connected to the gas-infusion chamber via the additive inlet and the floatation consolidator is configured to be operatively connected to the gas-infusion chamber via the additive outlet;
the gas-infusion apparatus is configured such that the additive has a sequential flow path from the additive source, through the gas-infusion chamber, and into the floatation consolidator, wherein the additive is infused with the gas prior to contacting a suspension or a liquid derived from the suspension; and
the gas diffuser is configured to diffuse the gas supplied thereto by producing microbubbles of the gas.

12. The gas-infusion apparatus of claim 11, further comprising a drive-water source configured to supply drive water to the additive, wherein the drive-water source is operatively connected to the gas-infusion apparatus upstream of the gas-infusion chamber.

13. The gas-infusion apparatus of claim 11, wherein the floatation consolidator is configured to separate solids or oils from the liquid via a process selected from the group consisting of dissolved air floatation, induced gas floatation, and suspended air floatation.

14. The gas-infusion apparatus of claim 11, wherein the system comprises a single injection tap configured to inject the gas-infused additive into the suspension or a liquid derived from the suspension.

15. The gas-infusion apparatus of claim 11, wherein the gas-infused additive is a sole source of gas injected into the system.

16. The gas-infusion apparatus of claim 11, wherein the microbubbles have a diameter of about 5 μm to about 100 μm.

17. A process for separating solids or oils from a liquid within a suspension, the process comprising:
dissolving microbubbles of a gas in an additive to produce a gas-infused additive;
injecting the gas-infused additive into the suspension;
mixing the gas-infused additive with the suspension; and
separating the solids or oils from the liquid via a method selected from the group consisting of dissolved air floatation, induced gas floatation, and suspended air floatation, wherein the microbubbles of the gas are dissolved in the additive prior to the additive contacting the suspension or a liquid derived from the suspension.

18. The process of claim 17, wherein the gas-infused additive is a sole source of gas injected into the suspension.

19. The process of claim 17, wherein the additive comprises a detackifying agent, a flocculation agent, a coagulation agent, an anionic polymer, a cationic polymer, a nonionic polymer, or a mixture thereof.

20. The process of claim 17, wherein the microbubbles have a diameter of about 5 μm to about 100 μm.

* * * * *